US008644477B2

(12) United States Patent
Gilbert et al.

(10) Patent No.: US 8,644,477 B2
(45) Date of Patent: Feb. 4, 2014

(54) DIGITAL MICROPHONE AUTOMIXER

(75) Inventors: Mark W. Gilbert, Park Ridge, IL (US); Gregory H. Canfield, Niles, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 1895 days.

(21) Appl. No.: 11/623,846

(22) Filed: Jan. 17, 2007

(65) Prior Publication Data

US 2007/0191977 A1 Aug. 16, 2007

Related U.S. Application Data

(60) Provisional application No. 60/763,428, filed on Jan. 31, 2006.

(51) Int. Cl.
*H04M 3/42* (2006.01)

(52) U.S. Cl.
USPC .................................................... 379/202.01

(58) Field of Classification Search
USPC ........................ 381/119; 379/202.01; 700/94
See application file for complete search history.

(56) References Cited

U.S. PATENT DOCUMENTS 5,673,327 A 9/1997 Julstrom
5,848,146 A 12/1998 Slattery
6,646,500 B2 11/2003 Li et al.

OTHER PUBLICATIONS

International Search Report for PCT/US 07/60909, dated Feb. 14, 2008, pp. 1-2.

*Primary Examiner* — Duc Nguyen
*Assistant Examiner* — Kile Blair
(74) *Attorney, Agent, or Firm* — Banner & Witcoff, Ltd.

(57) ABSTRACT

The invention provides a digital automixer system that includes a master processing unit and at least one non-master processing unit that are interconnected. The non-master processing unit obtains a first microphone signal and determines a first basic level measurement and a network submix audio signal. The master processing unit obtains a second microphone signal and determines a second basic level measurement, and obtains the first basic level measurement and the network submix audio signal from the non-master processing unit. The master processing unit further forms a final mix audio signal from the second microphone signal and the network submix audio signal and determines a gating control signal for the digital automixer system. The master processing unit may also delay the second basic level measurement to compensate for a network delay. The invention also provides a digital automixer system that includes a plurality of master processing units.

29 Claims, 10 Drawing Sheets

(Networked master processing unit)

400

(Non-Networked Automix System)

DIGITAL MICROPHONE AUTOMIXER

This application claims priority to provisional U.S. Application Ser. No. 60/763,428 ("A Digital Microphone Automixer"), filed Jan. 31, 2006.

FIELD OF THE INVENTION

The invention relates to selecting and mixing signals from microphones.

BRIEF SUMMARY OF THE INVENTION

With one aspect of the invention, a digital automixer system includes a master processing unit and at least one non-master processing unit that are interconnected. The non-master processing unit obtains a first microphone signal (or another audio source) and determines a first basic level measurement and a network submix audio signal. The master processing unit obtains a second microphone signal (or another audio source) and determines a second basic level measurement, and obtains the first basic level measurement and the network submix audio signal from the non-master processing unit. The master processing unit further forms a final mix audio signal from the second microphone signal and the network submix audio signal and determines a gating control signal for the digital automixer system. The master processing unit may also delay the second basic level measurement to compensate for a network delay.

With another aspect of the invention, the non-master processor obtains a gating control signal from the master processor.

With another aspect of the invention, a digital automixer system includes a plurality of master processing units. A first master processing unit obtains a first microphone signal and determines a first basic level measurement and a first network submix audio signal. A second master processing unit obtains a second microphone signal and determines a second basic level measurement and a second network submix audio signal. The first master processing unit further determines a first gating control signal from the first microphone signal and the second basic level measurement to control the first network submix audio signal and forms a final submix audio signal from the second network submix audio signal and the first microphone signal. The second master processing unit further determines a second gating control signal from the second microphone signal and the first basic level measurement to control the second network submix signal, and essentially forms a final submix audio signal from the first network submix audio signal and the second microphone signal.

DETAILED DESCRIPTION OF THE INVENTION

Architectural Considerations

Figure 1:
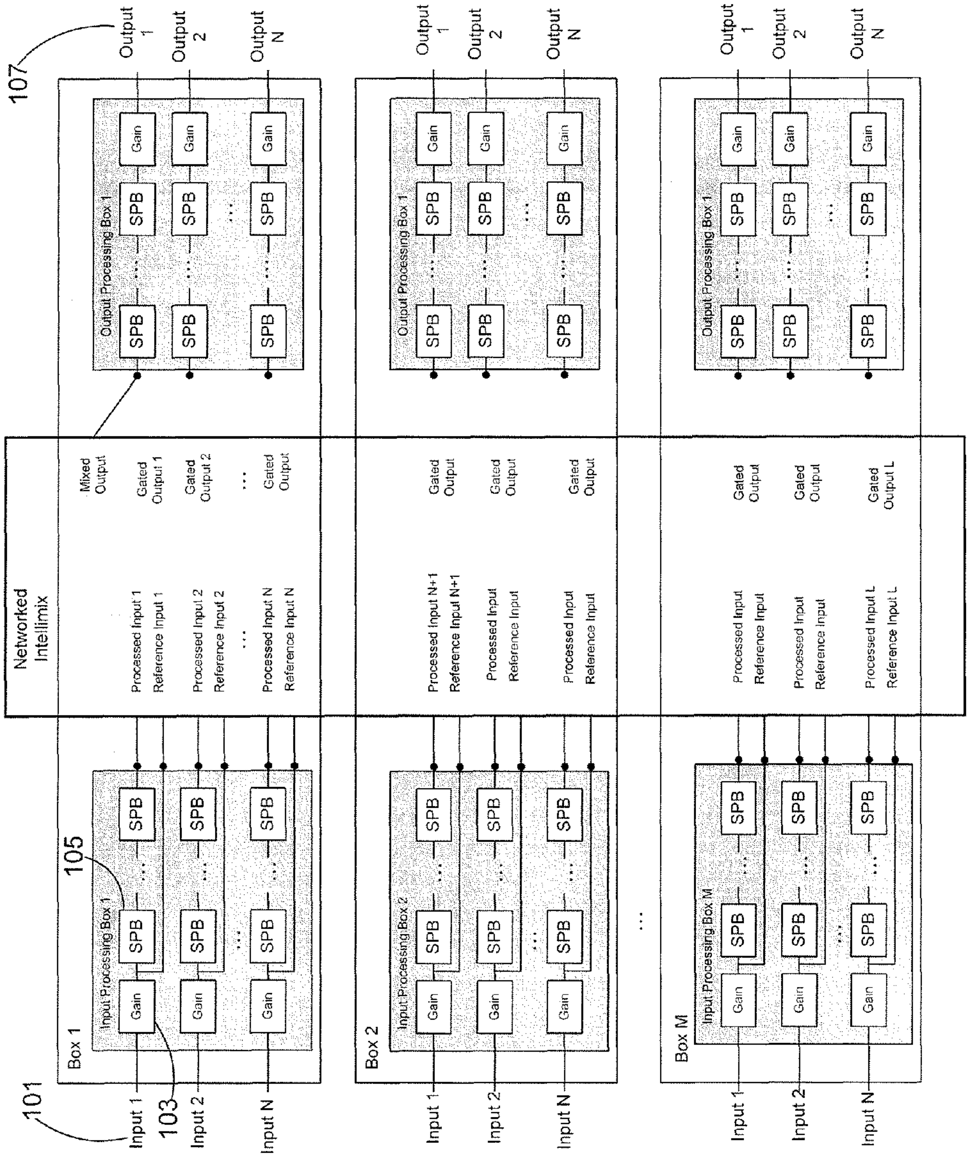
FIG. 1 shows an architecture of a digital audio processor that includes an automixer in accordance with an embodiment of the invention.

FIG. 1 shows an architecture of a digital audio processor that includes an automixer in accordance with an embodiment of the invention. The architecture shown in FIG. 1 includes a plurality of processing units ("boxes") that are interconnected. In an embodiment of the invention, each processing unit digitally processes 16 inputs to provide 8 outputs with high quality full duplex audio conferencing. The digital audio processor supports automatic mixing, echo cancellation, noise cancellation, and default installed presets. The digital audio processor also provides 24-bit conversion, 48 kHz sampling, and a dynamic range of 100 dB. The embodiment of the invention may support a different number of data bits (e.g., 32 bits rather than 24 bits) in order to achieve a desired processing accuracy. The embodiment may also support a telecommunications interface and a wireless remote control.

FIG. 1 shows a system configuration that includes M hardware processing units with a networked configuration. Each processing unit has multiple inputs (e.g., input 101 that is obtained from a microphone or another audio source) that are gain adjusted by gain module 103 and are processed by signal processing blocks (SPB e.g., SPB 105). Each SPB corresponds to a processing function that may be provided by one or more digital signal processors. Some processing by SPB's has the potential of interfering with a gating decision. For this reason in this configuration, signals are routed so an algorithm takes the reference input before the input SPB's. The reference signals are used in making a gating decision. The processed inputs are mixed to form the output (e.g., output 107). With some configurations, there may be one input signal routed for each channel. The signal may be used for both the gating decision and mixing.

The digital audio processor may be configured to support a system with one processing unit (as will be discussed) or with a plurality of processing units.

Appendices A, B, and C provide exemplary screen shots for configuring a digital audio processor system through a computer system. Appendix A shows a screen shot for input processing. Appendix B shows a screen shot for output processing. Appendix C shows a screen shot for configuring a digital audio processor system with two processing units.

Figure 2:
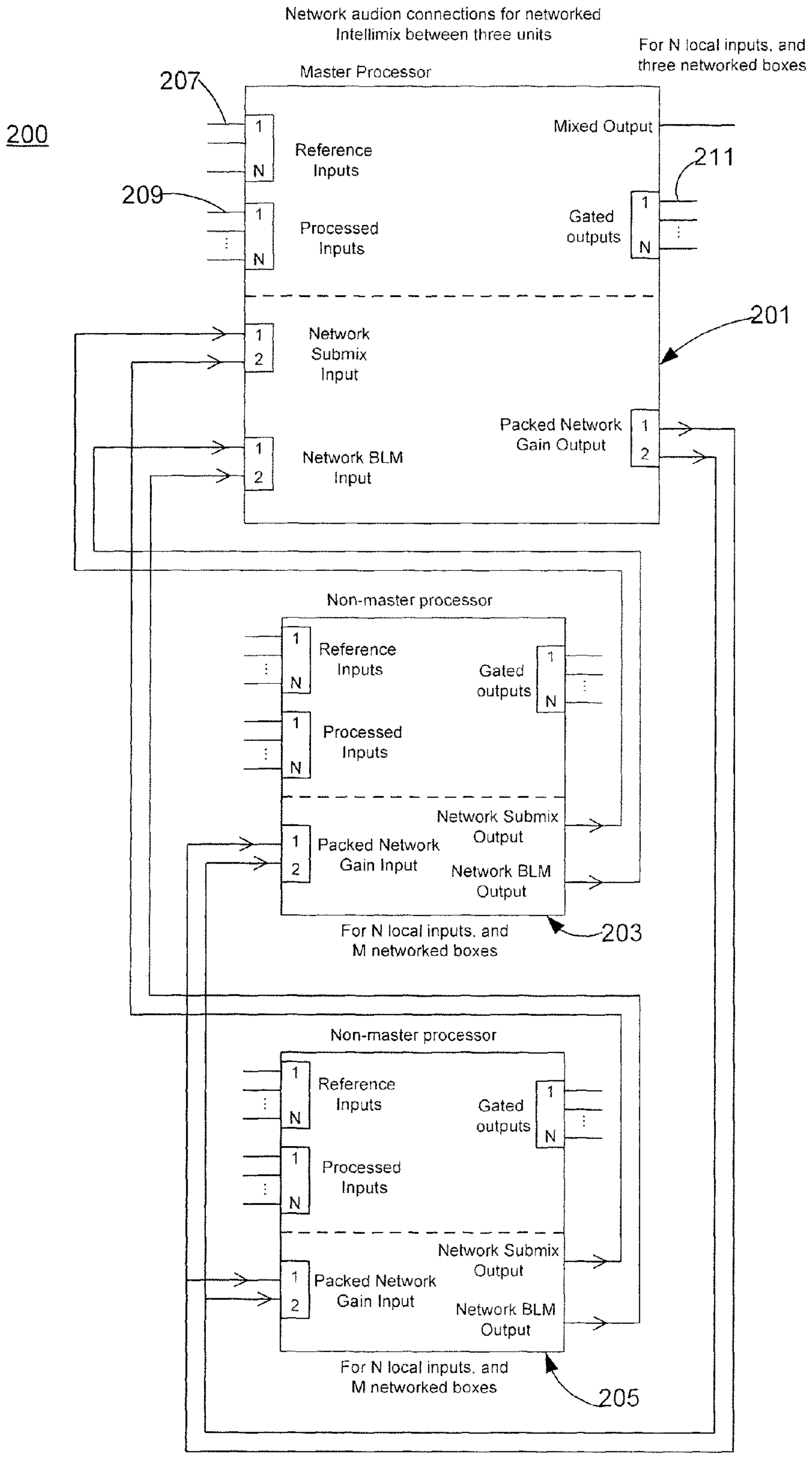
FIG. 2 shows a configuration with a master processors and a plurality of non-master processors in accordance with an embodiment of the invention.

FIG. 2 shows networked configuration 200 with a master processor and a plurality of non-master processors in accordance with an embodiment of the invention. Both master and non-master processing units have the local reference and processed inputs routed to it, and have the local gated outputs.

The mixed output only appears on the master processor. With the configuration shown in FIG. 1, processing unit 201 functions as a master processor and processing units 203 and 205 function as non-master processors. Only one of the processing units functions as the master processor. While configuration 200 illustrates a configuration with three "boxes" (e.g. one master processing unit and two non-master processing unit), the embodiment may support another number of "boxes" as limited by the processing capability. For each input channel there is a reference input 207 and a processed input 209. The reference input is used to make the gating decision for a given channel. The processed input is the signal for a given channel to which the gating is applied and which is mixed to form the mixed output. FIG. 1 shows an example where the reference input is taken prior to the signal processing blocks. This routing prevents signal processing blocks from interfering with the gating decision. In this example, the processed input is taken after the input processors. Note that in some applications a processed input and a reference input would be taken at the same location and would be the same signal. For each input channel there is a gated output that can be generated. This is the input signal for a given channel with gating being applied to it. Any of the gated outputs (e.g., gated output 211) may be used by a user for any specific purpose.

Figure 3:
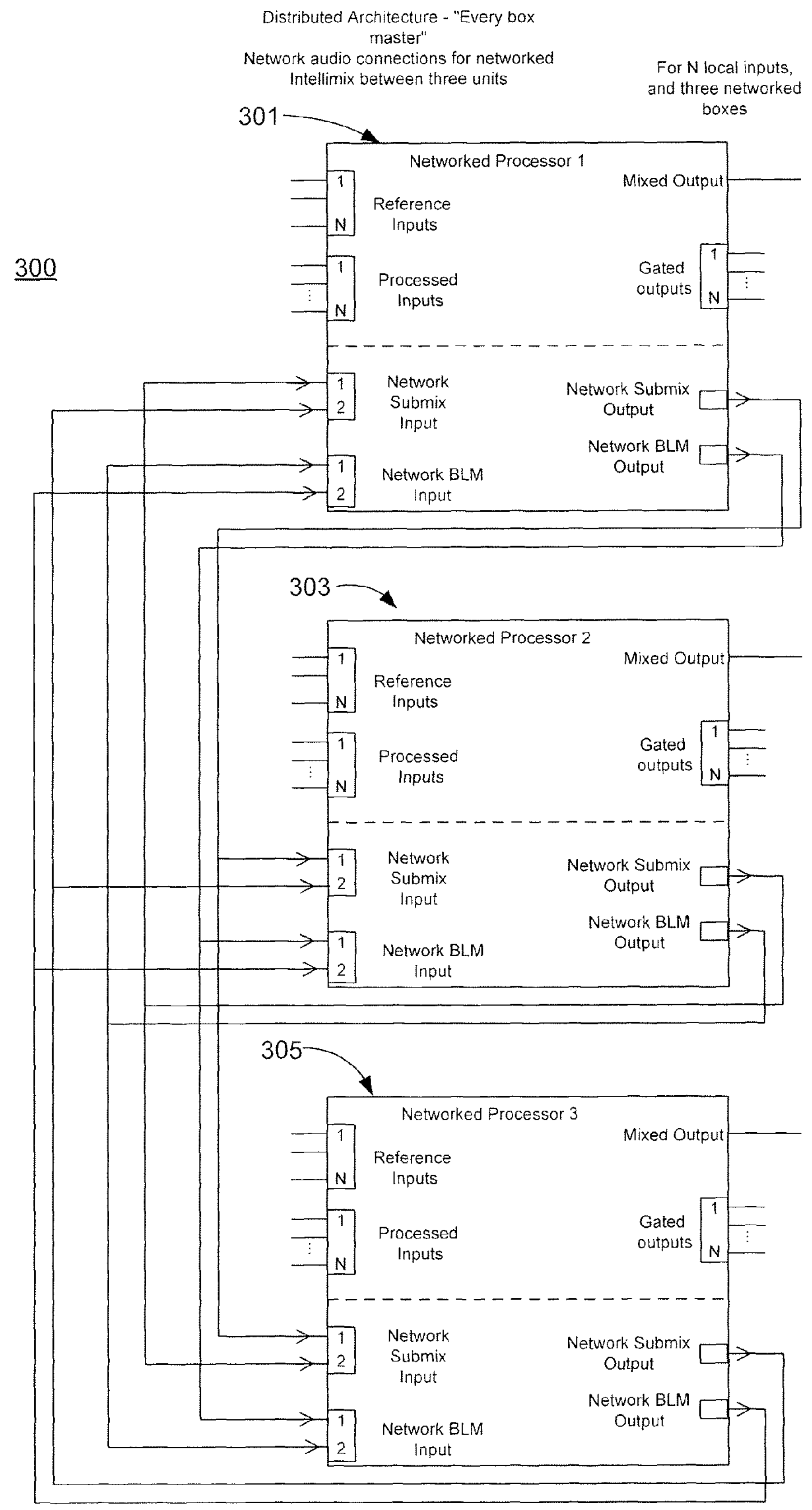
FIG. 3 shows a configuration that supports a distributed architecture in accordance with an embodiment of the invention.

FIG. 3 shows networked configuration 300 that supports a distributed architecture in accordance with an embodiment of the invention. Each processing unit 301-305 functions as a master processor.

Figure 4:
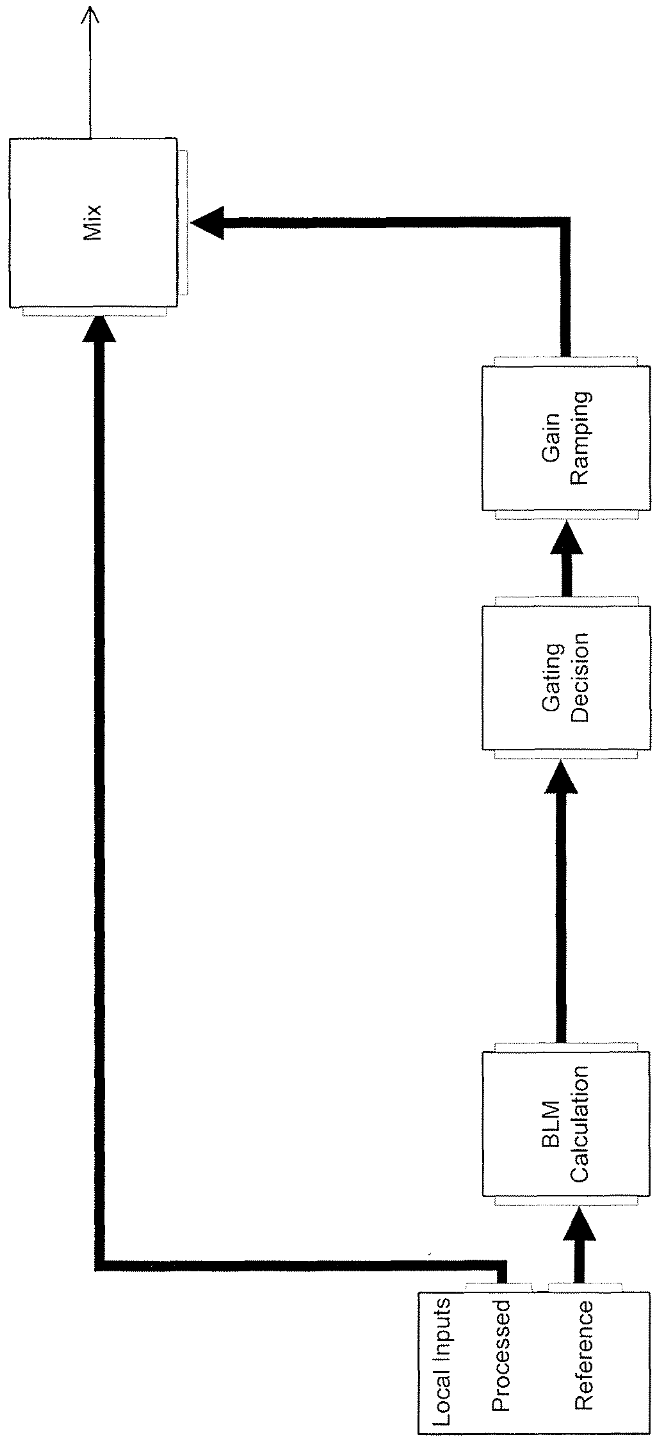
FIG. 4 shows a processing unit of an automixer system for a non-networked configuration in accordance with an embodiment of the invention.

FIG. 4 shows processing unit 400 of an automixer system for a non-networked configuration in accordance with an embodiment of the invention, in which there is only one "box" supporting the automixer system. A non-networked algorithm supports reference inputs and processed inputs routed as inputs. Processing unit 400 has a mixed output and gated outputs routed as outputs, in which all functions are preformed on one unit.

Figure 5:
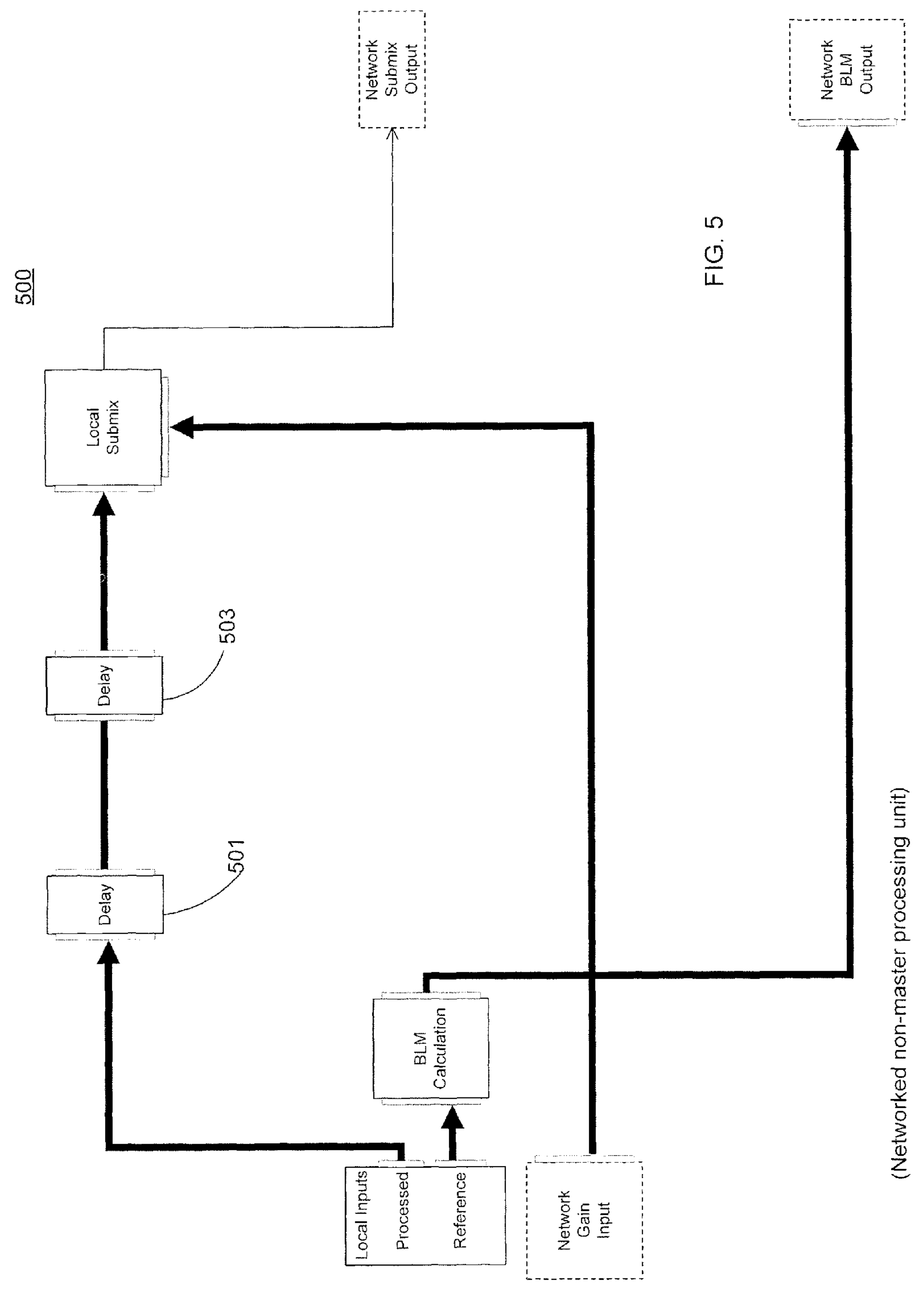
FIG. 5 shows a non-master processing component of an automixer system for a networked configuration in accordance with an embodiment of the invention.

FIG. 5 shows non-master processing unit 500 of an automixer system for a networked configuration in accordance with an embodiment of the invention. Each delay module (e.g., gain module 501) provides a time delay to compensate for associated network characteristics (e.g., differences in processing times with respect to different processing units). As shown in FIG. 5, delay module 501 and delay module 503 may be implemented with one delay module with some embodiments of the invention.

Figure 6:
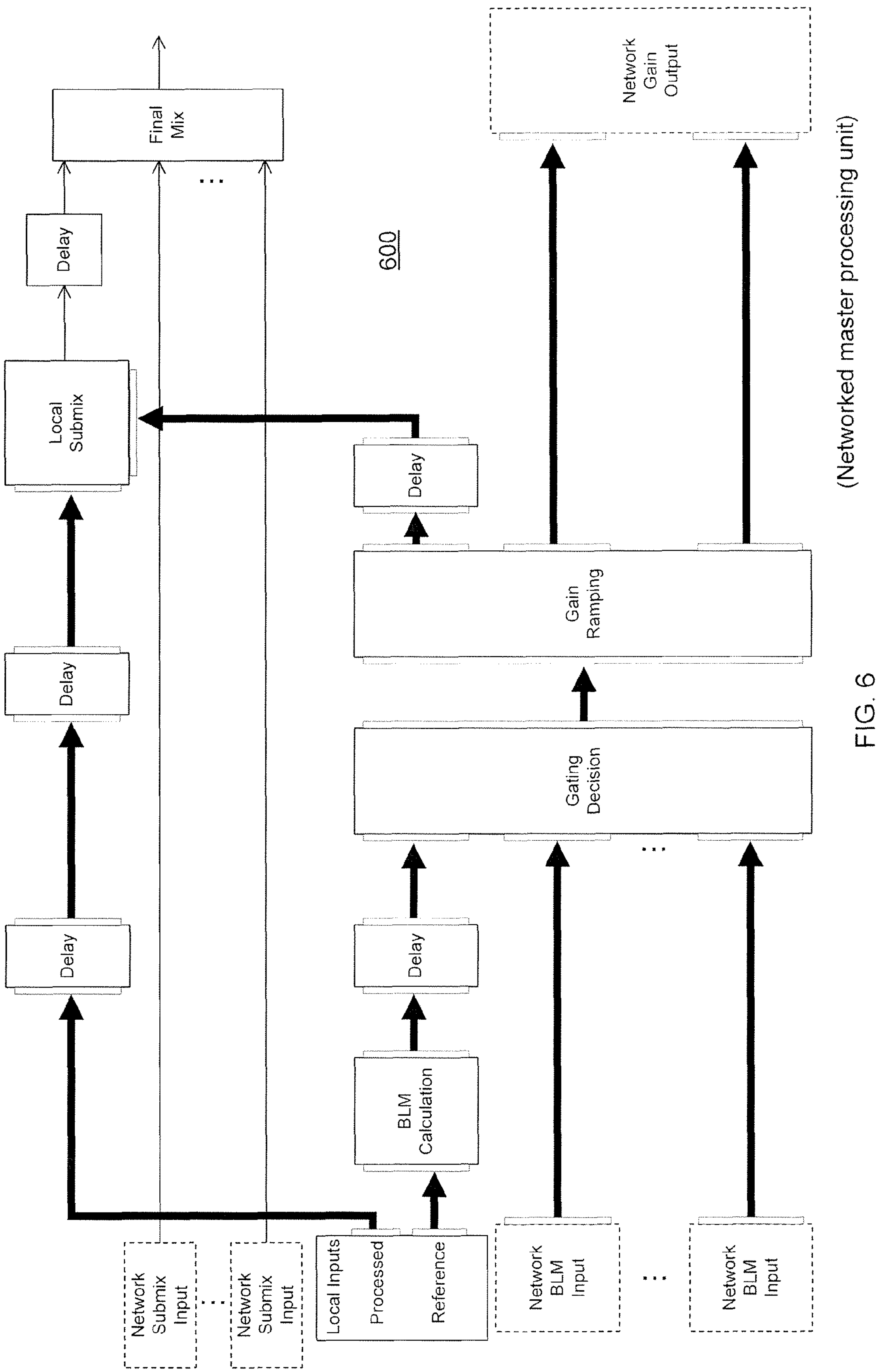
FIG. 6 shows a master processing unit of an automixer system for a networked configuration in accordance with an embodiment of the invention.

FIG. 6 shows a master processing unit 600 of an automixer system for a networked configuration in accordance with an embodiment of the invention. As shown in FIG. 2, there are two types of networked processing units (corresponding to master processing unit 600 and non-master unit 500), each have different routing. Both master processing unit 600 and non-master processing unit 500 have the local reference and processed inputs routed to it, and have the local gated outputs. The mixed output only appears on the master processing unit 600. FIGS. 5 and 6 show the connections for both types of processors.

Non-master processing unit 500 obtains assigned inputs, performs basic level measurement (BLM) calculation (as will be later discussed), and sends them to the master processing unit 600. The master processing unit 600 obtains assigned local BLM values, delaying them by one network jump, and uses them with the BLM values received over the network to perform a decision making for the entire network. Master processing unit 600 also performs the gain ramping. The gains are then sent out to all the boxes on the network which perform a local submix on their inputs. The non-master processing units (e.g., non-master processing unit 500) then send their outputs to the master processing unit 600 to form a final mix audio signal. This arrangement saves on processing time, but it takes three network jumps.

Figure 7:
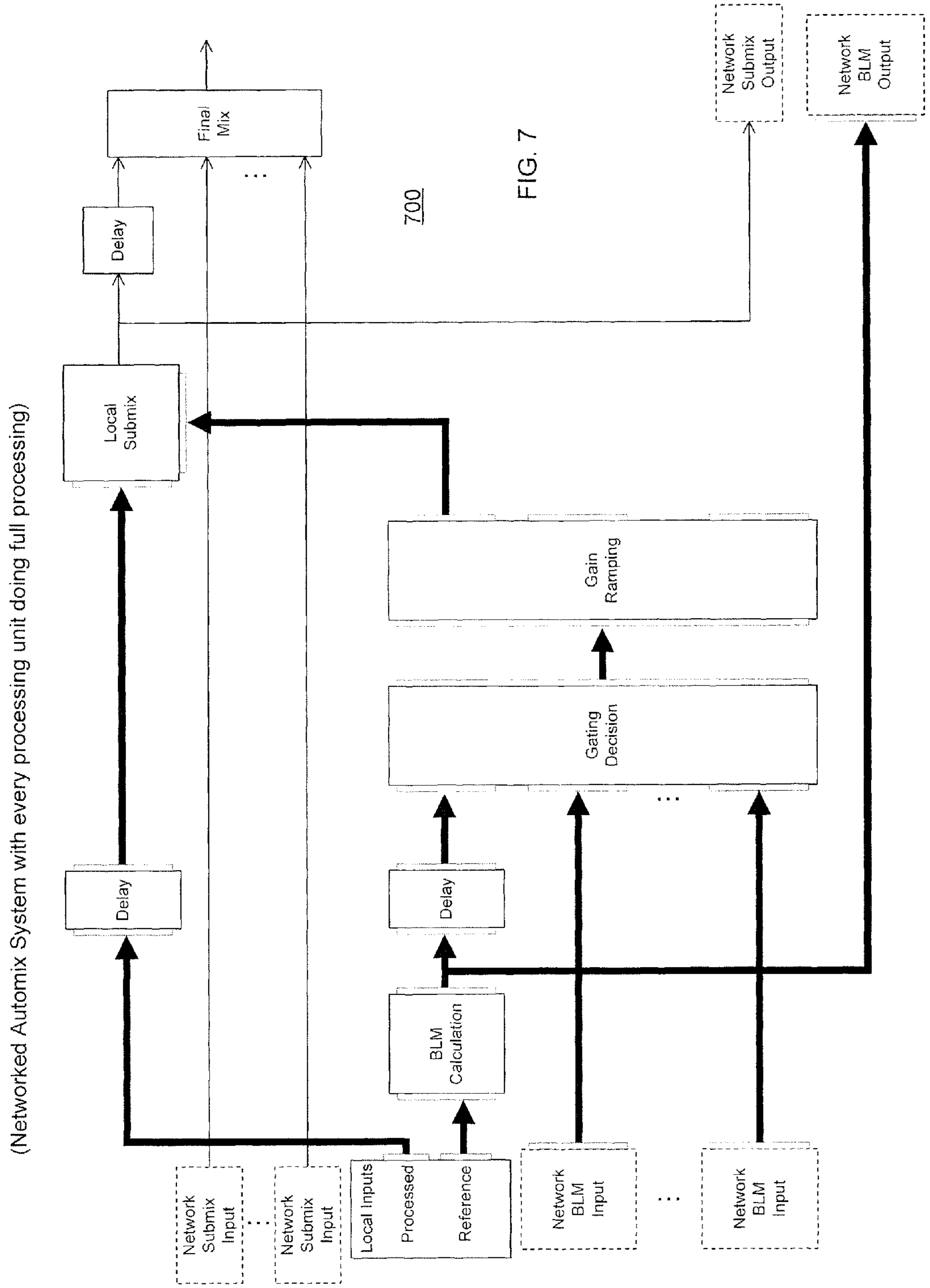
FIG. 7 shows a master processing unit of an automixer system for a networked configuration in accordance with an embodiment of the invention.

FIG. 7 shows a master processing unit 700 of an automixer system for a networked configuration (corresponding to configuration 300 and having a plurality of master processing units as shown in FIG. 3) in accordance with an embodiment of the invention. Each master processing unit 700 calculates the BLM for its local channels and sends the information off to every other box on the network. Each master processing unit 700 then does a full gating calculation and uses the results of the calculation to perform a local submix of its inputs. Master processing unit 700 then sends its submix to all the other boxes. Each master processing unit 700 takes the submix from other master processing units and performs a final mix. This arrangement uses more DSP resources and more network channels, but it saves one network jump so the algorithm is done with two network jump time delays.

Networked Audio Considerations

All Channels Routed

With an embodiment of the invention, all channels are configured to be routed to the box doing the mixing. With this configuration, all the microphone signals are sent to one processing unit (box) to do the mixing. For a total of N boxes, each with M channels contributing to the mix:

Each non-mixing box transmits M channels of 48 kHz, 24 bit data.

The mix box receives M*(N−1) channels of 48 kHz, 24 bit data.

The final mix is only located on the mix box. There is a delay of one network jump needed to keep the local channels aligned with those arriving over the network. However, with other embodiments of the invention, a digital automixer system may be configured to perform mixing over a plurality of processing units. For example, with a "master/non-master processor" configuration (e.g., system 200 as shown in FIG. 2) or an "only master processor" configuration (e.g., system 300 as shown in FIG. 3), processing at a processing unit and the total amount of transferred information between processing units are reduced.

Configuration with Master Box

For a total of N networked boxes:

The master box receives 2*(N−1) channels of 48 kHz, 24 bit data.

The master box does a broadcast transmit of one or two channels of 48 kHz, 24 bit data.

Each non-master box receives one or two channels of broadcast 48 kHz, 24 bit data.

Each non-master box transmits 2 channels of 48 kHz, 24 bit data to master box.

With the compensation to keep the gating and audio in sync there is a delay in the output equivalent to 3 network jumps. The output of the algorithm is only generated at the master box. To be used on the non-master boxes it would need to be routed as a standard audio channel.

Configuration with No Master Box

Every box receives 2*(N−1) channels of 48 kHz, 24 bit data.

Every box does a broadcast transmit of 2 channels of 48 kHz, 24 bit data.

With the compensation to keep the gating and audio in sync there is a delay in the output equivalent to 2 network jumps. The output is calculated and is available on every box in the network.

Network Data Formatting and Error Checking

Two channels of 24 bit data sent to the master box contain the submix from the other boxes, plus the Basic Level Estimate for each input on those boxes. The submix is real time audio and needs to be sent every sample. This is transferred as a 32 bit floating point value using up one of the 24 bit channels and 8 bits of the other. The remaining 16 bits are used to transmit the Basic Level Measurements. These only need to be transmitted once every 1 msec. Multiple BLM's in 32 bit floating point format are sent across the network 8 bits at a time. The remaining 8 bits of the two 24 bit channels are used to keep the data synchronized.

Different signal types between processing unit may utilize different bandwidths. For example, network submix outputs may be sent as full bandwidth network audio signals. The network BLM output and the network gain outputs (gating control signals) may be transferred so a full set are transferred only once every 1 msec. The transferred values are packed so multiple channels worth of information may be sent in a single full bandwidth network audio channel, thus reducing the amount of information that needs to be transferred between the processing units.

Embodiments of the invention support a gating control signal that contains information for gating a plurality of microphones in an automixer system. In such a case, the number of associated microphones may vary from two to the total number of microphones in the automixer system. However, embodiments of the invention may support a separate gating control signal for each microphone.

An exemplary data format is shown as follows:

```
h                                  l
|MFDDDDDD|EEEEEEEE|SSSSSSSS|       word 1
|SSSSSSSS|SSSSSSSS|SSSSSSSS|       word 2
M = transfer format (1 bit)
    0 = this method, 1 = future formats
F = frame sync (1 bit)
    1 = frame start, 0 otherwise
D = Data (6 bits)
        frame 0: nnnnnn      (frame 0 sent when frame sync = 1)
        frame 1: eeeebb   (frame 1 sent next slot after frame sync = 1)
        frame 2: eeeebb
        ...
        where    bb = byte of E being sent (0 to 3)
                 eeee = 4 lsb of count of E being sent (0 to 7)
        nnnnn = number of channels of E to be transferred
E = Subsection of E being sent (8 bits). When packed gives 32 float
values for E
      frame 0: most significant   bits (31-24) for first chan
      frame 1:                    bits (23-16) for first chan
      frame 2:                    bits (15-8) for first chan
      frame 3: least significant bits (7-0) for first chan
      frame 4: most significant   bits (31-24) for second chan
       ...
S = Submix for box (32 bits)
    This forms a 32 bit float value, with the 8 bits on word 1 being
    the least significant bytes (bits 7-0), word 2 contains the most
    significant portion (bits 31-8)
```

Network Delays

The algorithm uses time of arrival as one of the main decision making criteria determining what channels are gated on. For this reason any networking system that introduces significant delays requires delay compensation within the algorithm. Local signals that are used with ones that made a network jump must have a delay added to keep them time aligned with the networked signal.

For general mixing when there is a possibility of mixing together highly correlated signals such as a stereo pair, having a different delay between the two signals can introduce comb filtering. This can lead to audio artifacts even if there is only one sample delay between the summed signals.

With one embodiment of the invention, there was an approximate time delay of 5.3 msec per network jump. Other networking methods may have a shorter or longer time delay per jump. The delay compensation method assumes the delay per network jump is known and does not vary once the channel is routed.

In an embodiment the method of delay compensation places delay blocks at points in the signal path so signals align at various points in the algorithm. When a box receives BLM values over the network (e.g., as shown in FIG. 6) a delay is added to its local BLM values so they align with those that incurred a network transfer delay. When a local submix is formed with gating information from a remote box (e.g., as shown in FIG. 5), two network delays are added to the local signals before they are mixed since one network delay was incurred sending BLM values to the remote box and one transferring the gating information back. Other delays are added as needed to align signals. Depending on the application and latency of the network transmission delay compensation may not be needed in all implementations. Note that the delays are not shown on FIGS. 8, 9, and 10.

Processing Rate and Network Transmission Issues

The BLM calculations are processed at the full sample rate. After the BLM signals are generated, the gating decision can be processed at a reduced rate. This reduces the processing power needed to implement the gating decision, allowing the gating decision for a large number of channels to be processed on a single processor. The mixing of the signals is done at full rate to maintain the audio bandwidth. Note that this technique of implementing automatic mixing with parts of the algorithm at a reduced rate could be implemented in different manners.

A technique is also used which reduces the amount of information that needs to be transferred between units. The BLM is transferred across the network at a reduced rate. The gating decision is also transferred over the network at a reduced rate. Transferring these signals, or other signals that enable the multiple boxes to work off of a common or identical gating decision, between boxes allows the networked boxes to submix their local inputs based on a common gating decision. This allows each box to only transfer one full bandwidth gated submix per box to a common location to form a mix of all the inputs network wide. This greatly reduces the bandwidth needed when compared to transferring all the channels to a common point. The technique of reducing the amount of information that needs to be transferred over the network could be applied in different manners to achieve networked automatic mixing.

Signal Processing

The contents of U.S. Pat. No. 4,489,442 ("Sound Actuated Microphone System"), U.S. Pat. No. 4,658,425 ("Microphone Actuation Control Suitable for Teleconference Systems"), U.S. Pat. No. 4,712,231 ("Teleconference System"), U.S. Pat. No. 5,297,210 ("Microphone Actuation Control System"), and U.S. Pat. No. 6,137,887 ("Directional Microphone System") are incorporated herein by reference, as if fully set forth below.

Figure 8:
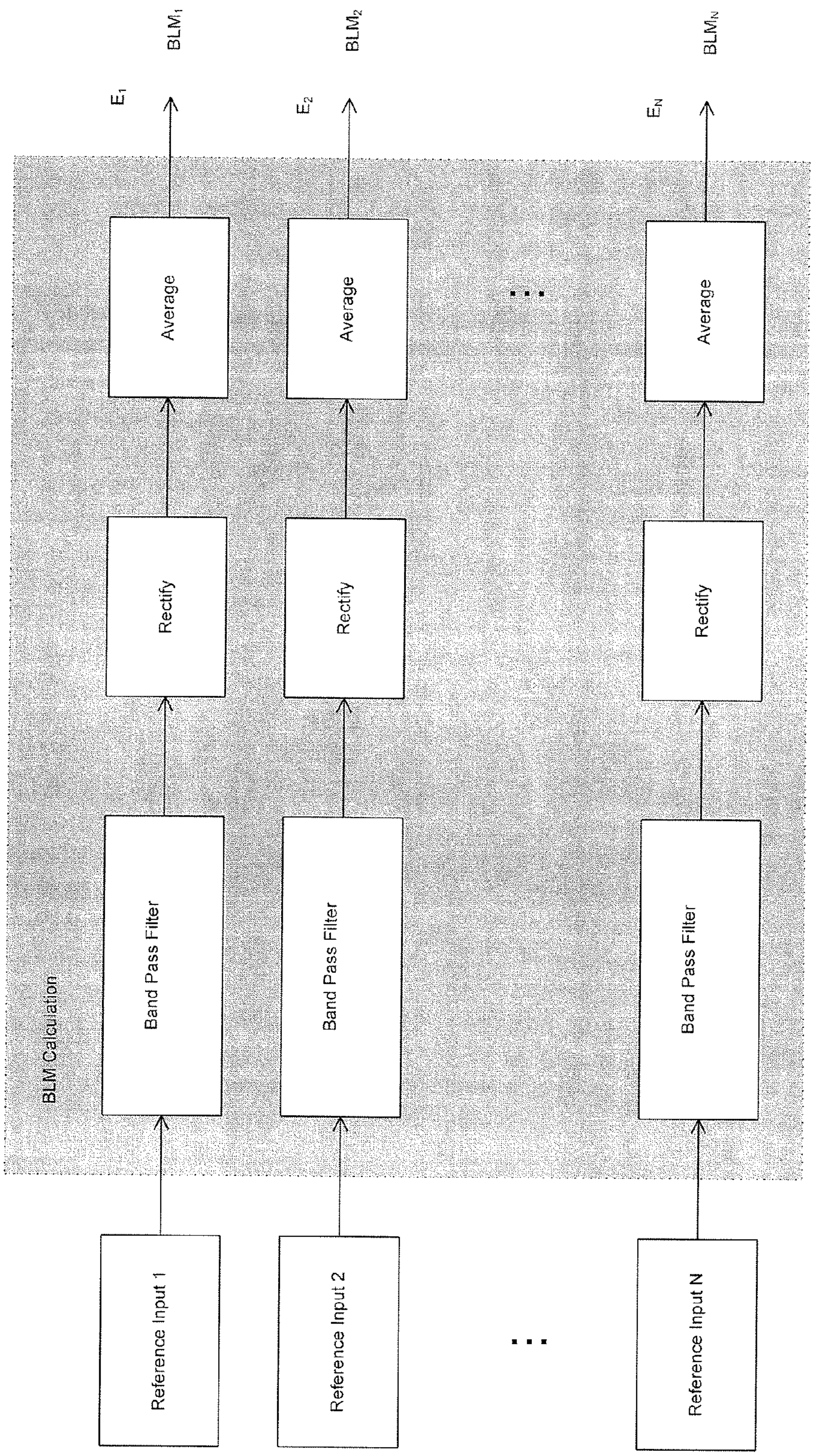
FIG. 8 shows a signal flow diagram for basic level measurements (BLM) in accordance with an embodiment of the invention.

FIG. 8 shows a signal flow diagram for basic level measurements (BLM) in accordance with an embodiment of the invention.

The BLM calculation takes each input, and calculates a basic level measurement. In an embodiment of the invention, the BLM is the only information from the input signals that the algorithm uses when making its gating decision. The BLM calculation is done by taking each input signal and applying a bandpass filter. This biases the decision making to the basic speech band, with a de-emphasis of the lower frequencies to help reduce false triggering on lower frequency noise. The filtered signal is then rectified and averaged to get a level estimate of the input. This is referred to as the BLM or as the signal E.

The BLM values vary slowly compared to the full sample rate and can therefore be subsampled and transferred over the network at a reduced rate. This allows multiple boxes to perform calculations for their local input channels in parallel and transfer results to a common point or points in the network for further processing. The above considerations may be applied to the calculation of other signals that are subsequently discussed.

Figure 9:
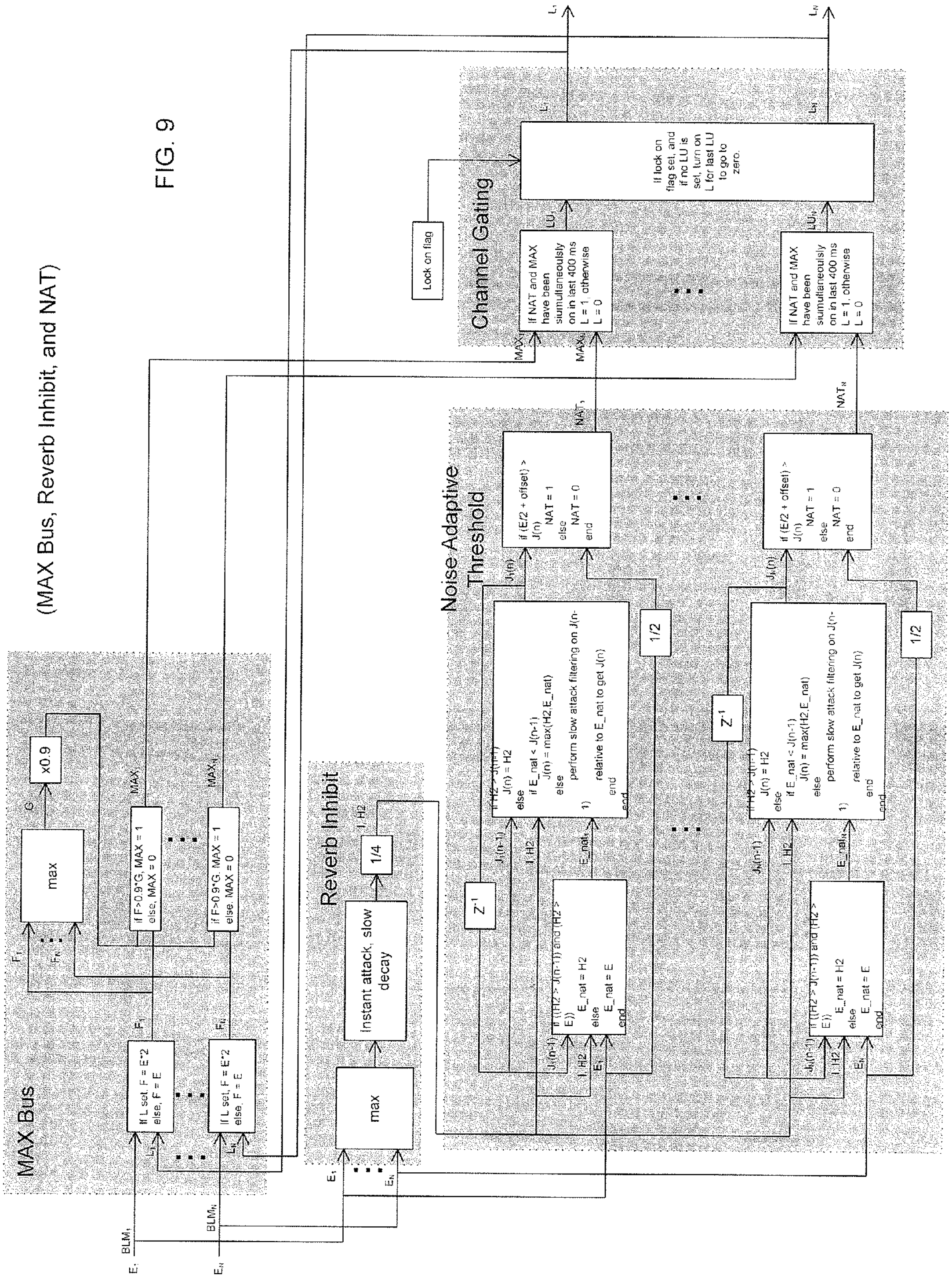
FIG. 9 shows a signal flow diagram for channel gating in accordance with an embodiment of the invention.

FIG. 9 shows a signal flow diagram for channel gating in accordance with an embodiment of the invention. An algorithm supports a channel gating decision, which consists of a MAX Bus calculation, Reverb Inhibit calculation, and the Noise Adaptive Threshold (NAT) calculation.

The MAX bus is used to keep more than one microphone from gating on when the same talker is being picked up by multiple microphones, while allowing multiple microphones to turn on when multiple talkers are present. It does this through the use of a MAX bus which is the maximum level of a scaled input for any input signal. In making the max bus the BLM for any input that was gated on gets a 6 dB increase. If one of the scaled signals is greater than 0.9 multiplied by the Max bus it will have its MAX flag gated on.

When a talker starts the BLM for the closest loudest microphone signal will increase first, and will take the MAX bus. When the channel gates on it will get a 6 dB advantage. If the same talker is received at any other microphones that are further away the signal in general will be lower in amplitude and time delayed. Since the signal from the talker in the best microphone has a 6 dB advantage it should remain above the signal from any other microphone picking up the same talker.

If second talker starts the peaks in the signal from their best microphone at points will rise above the max. This way the second microphone will be able to gate on its max bus and turn its channel on, and then also get a 6 dB advantage, that will prevent other microphones from gating on for the second talker. Since the peaks in the signals of the two talkers will occur at different times each having the 6 dB advantage should not prevent each from getting the max bus.

When determining a MAX bus advantage criteria, one may consider two simultaneous talkers, each being picked up by multiple microphones. In the case where there is one talker, when a talker starts the channel takes the NAT condition and will also exceed the other channels and take the MAX bus, and turn on the 6 dB MAX bus advantage. This 6 dB advantage will keep delayed versions of the same signal from gating on. When a second talker is present it will at times exceed the level and take the max bus advantage. When the signal from the second talker decreases if it is at a point where the delayed signal of the first talker is greater, the delayed version could take the MAX bus if it has not maintained its 6 dB max bus advantage, and thus gate on the wrong microphone. Having the max bus advantage based on a channel gate on, with its 400 ms hold time will help keep only the best microphone gated on in a situation with multiple talkers.

The Reverb Inhibit is a signal that tracks ¼ of the maximum of any of the non-scaled BLM's. The reverb inhibit has an instantaneous attack, slow decay filter applied, while in the analog circuitry no averaging is applied.

The Noise Adapting Threshold (NAT) is used to determine if the signal being received by a microphone is above a background noise influenced threshold. If the signal is a given amount above this threshold it is assumed the microphone is picking up a signal. It tracks the noise floor with a fast decay slow attack filter. If the BLM for a channel is greater than 6 dB above this level it will trigger on the NAT. If the NAT falls below ¼ max (E) across all the channels the NAT may be reset to this value.

If the reverb inhibit signal divided by 4 is greater than the current noise floor measurement it will be set equal to the reverb inhibit signal.

When making the comparison between the NAT level and the BLM there is noise threshold that is put in to prevent very low level signals from causing the algorithm to false trigger. In the analog algorithm this is (when both NAT and MAX are on) a constant that is subtracted from the BLM so for low levels it will never be greater than the NAT threshold.

Once the NAT and MAX levels have been determined for each channel these are used to decide which channels to gate on. If NAT and MAX have simultaneously been on in the last 400 ms the channel is gated on. A lock on function is done so if all the channels would turn off it will keep the last channel that would have gated off from gating off.

Figure 10:
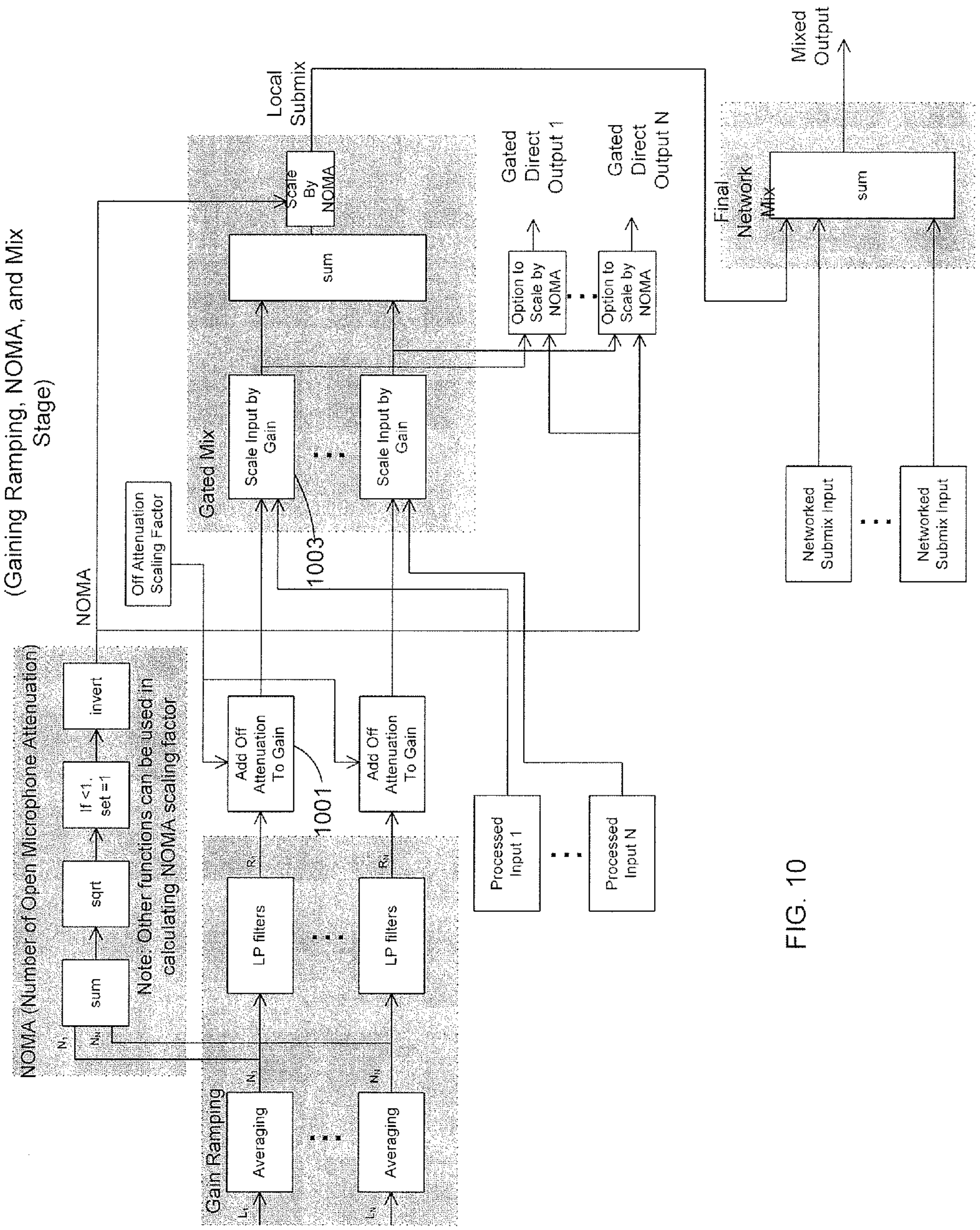
FIG. 10 shows a signal flow diagram for gain ramping, gain adjustment, and mixing in accordance with an embodiment of the invention.

FIG. 10 shows a signal flow diagram for gain ramping, gain adjustment, and mixing in accordance with an embodiment of the invention. The gating signals are averaged. These are used to calculate a NOMA (number of open microphone attenuation) scaling factor. The gatings signals are low pass filtered to form a gain signal. With element 1001 an off attenuation scaling factor is added to each of the gain values. At this point the gain values and the NOMA value can be transferred between boxes as the Network Gain Output. With element 1003 the local processed inputs are multipled by the gain value. These signals are sumed and scaled by the NOMA factor to get the Local Submix. The master processor adds its local submix to the submix received over the network to generate the mixed output. Note that the gating decision and gain ramping can be calculated and transferred between boxes at a reduced rate. When the reduced rate signals are upsampled to the full processing rate a smoothing filter may be applied.

We claim:

1. A digital automixer system, comprising:

a first non-master processing unit obtaining a first microphone signal from a first microphone and determining a first basic level measurement (BLM) and a first network submix audio signal by digitally processing the first microphone signal; and a master processing unit obtaining a second microphone signal from a second microphone, determining a second basic level measurement by digitally processing the second microphone signal, obtaining the first basic level measurement and the first network submix audio signal from the first non-master processing unit, forming a final mix audio signal from the second microphone signal and the first network submix audio signal, producing a noise adaptive threshold signal that is indicative of a received microphone signal being above a background noise threshold, and determining a gating control signal for the first microphone from the first basic level measurement, the second basic level measurement, and the noise adaptive threshold signal.

2. The digital automixer system of claim 1, the first non-master processing unit using the gating control signal to form the first network submix audio signal.

3. The digital automixer system of claim 1, the master processing unit mixing a plurality of local microphone signals with the first network submix audio signal to obtain the final mix audio signal.

4. The digital automixer system of claim 1, further comprising:
a second non-master processing unit obtaining a third microphone signal from a third microphone and determining a third basic level measurement (BLM) and a second network submix audio signal by digitally processing the third microphone signal; and
the master processing unit mixing the second network submix audio signal with the first network submix audio signal and the second microphone signal to form the final mix audio signal.

5. The digital automixer system of claim 1, the master processing unit delaying the second basic level measurement to compensate for a network delay.

6. The digital automixer system of claim 1, the first non-master processing unit processing the first microphone signal at a full sample rate to obtain the first basic level measurement and transferring the first basic level measurement at a first reduced sample rate to the master processing unit.

7. The digital automixer system of claim 1, the first non-master processing unit filtering and rectifying the first microphone signal to obtain a filtered rectified signal and averaging the filtered rectified signal to obtain the first basic level measurement.

8. The digital automixer system of claim 1, the master processing unit transferring the gating control signal at a second reduced sample rate to the first non-master processing unit.

9. The digital automixer system of claim 8, the non-master processing unit upsampling and processing the transferred gating control signal to form a full sample rate gain signal.

10. The digital automixer system of claim 1, the master processing unit comprising a first processing component, the first processing component processing a plurality of basic level measurements to produce the gating control signal, the plurality of basic level measurements including the first and second basic level measurements, the gating control signal gating only a first microphone of a first plurality of microphones that receive a first speech signal from a first user.

11. The digital automixer system of claim 10, the first processing component processing the plurality of basic level measurements to produce another gating control signal, the other gating control signal gating only a second microphone of a second plurality of microphones that receive a second speech signal from a second user.

12. The digital automixer system of claim 1, the master processing unit comprising an additional processing component, the additional processing component producing a max signal for a microphone input of a channel, the max signal being derived by comparing a scaled basic level measurement for the channel with a derived signal, the derived signal being derived from a maximum of all scaled basic level measurements of the digital automixer system, the max signal being used to create the gating control signal for the channel.

13. The digital automixer of claim 12, wherein a first channel for a first talker has a predetermined gain advantage over a second channel for the first talker.

14. The digital automixer of claim 13, wherein the predetermined gain advantage prevents the second channel from picking up the first talker.

15. The digital automixer of claim 14, wherein a third channel has the predetermined gain advantage over a fourth channel for a different talker when signal peaks for the different talker and for the first talker occur at different times.

16. The digital automixer system of claim 1, the master processing unit producing the gating control signal, the gating control signal conveying information indicative of a gating level state.

17. The digital automixer system of claim 16, the master processing unit determining a value of the gating level state, the master processing unit selecting the value from an on-state, an off-state, and an intermediate state.

18. The digital automixer system of claim 1, the master processing unit comprising a third processing component, the third processing component inhibiting the gating control signal from reverberations of the first speech signal.

19. The digital automixer system of claim 1, further comprising:
a second non-master processing unit; and
the master processing unit determining a gating decision for all microphones in the digital automixer system based on a plurality of basic level measurements from the first and second non-master processing units.

20. The digital automixer system of claim 19, wherein the master processing unit determines a limit of a number of microphones that can be activated in the digital automixer system at a particular time.

21. A digital automixer system, comprising:
a first master processing unit obtaining a first microphone signal from a first microphone, producing a noise adaptive threshold signal that is indicative of a received microphone signal being above a background noise threshold, and determining a first basic level measurement (BLM) and a first network submix audio signal by digitally processing the first microphone signal;
a second master processing unit obtaining a second microphone signal from a second microphone and determining a second basic level measurement (BLM) and a second network submix audio signal by digitally processing the second microphone signal;
the first master processing unit determining a first gating control signal from the first microphone signal and the second basic level measurement, and the noise adaptive threshold signal to control the first microphone signal and forming a final submix audio signal from the second network submix audio signal and the first microphone signal; and
the second master processing unit determining a second gating control signal from the second microphone signal and the first basic level measurement to control the second microphone signal, and essentially forming the final submix audio signal from the first network submix audio signal and the second microphone signal.

22. The digital automixer system of claim 21, the first master processing unit comprising a first processing component, the first processing component processing a plurality of basic level measurements to produce the first gating control signal, the plurality of basic level measurements including the first and second basic level measurements, the first gating control signal gating only a first microphone of a first plurality of microphones that receive a first speech signal from a first user.

23. The digital automixer system of claim 22, the first processing component processing the plurality of basic level measurements to produce another gating control signal, the other gating control signal gating only a second microphone of a second plurality of microphones that receive a second speech signal from a second user.

24. The digital automixer system of claim 21, the master processing unit comprising a third processing component, the third processing component inhibiting the gating control signal from reverberations of the first speech signal.

25. A method for supporting audio conferencing with a plurality of microphone, comprising:

obtaining, by a first unit, a first microphone signal from a first microphone;

determining, by the first unit, a first basic level measurement (BLM) and a first network submix audio signal by digitally processing the first microphone signal;

obtaining, by a second unit, a second microphone signal from a second microphone;

(determining, by the second unit, a second basic level measurement by digitally processing the second microphone signal;

forming, by the second unit, a final mix audio signal from the second microphone signal and the first network submix audio signal;

producing a noise adaptive threshold signal that is indicative of a received microphone signal being above a background noise threshold;

determining, by the second unit, a gating control signal from the first basic level measurement and the second basic level measurement, and the noise adaptive threshold signal; and forming, by the first unit, the first network submix audio signal using the gating control signal.

26. The method of claim 25, further comprising:

delaying, by the second unit, the second basic level measurement to compensate for a network delay.

27. The method of claim 25, further comprising:

processing, by the first unit, the first microphone signal at a full sample rate to obtain the first basic level measurement and transferring the first basic level measurement at a first reduced sample rate to the second unit.

28. The method of claim 25, further comprising:

transferring the gating control signal at a second reduced sample rate to the first unit.

29. A method for supporting audio conferencing with a plurality of microphones, comprising:

obtaining, by a first unit, a first microphone signal from a first microphone;

determining, by the first unit, a first basic level measurement (BLM) and a first network submix audio signal by digitally processing the first microphone signal;

obtaining, by the second unit, a second microphone signal from a second microphone;

determining, by the second unit, a second basic level measurement (BLM) and a second network submix audio signal by digitally processing the second microphone signal;

producing a noise adaptive threshold signal that is indicative of a received microphone signal being above a background noise threshold;

determining, by the first unit, a first gating control signal from the first microphone signal and the second basic level measurement, and the noise adaptive threshold signal to control the first microphone signal and forming a final submix audio signal from the second network submix audio signal and the first microphone signal; and determining, by the second unit, a second gating control signal from the second microphone signal and the first basic level measurement to control the second microphone signal, and essentially forming the final submix audio signal from the first network submix audio signal and the second microphone signal.

* * * * *